United States Patent [19]
Yoshimura et al.

[11] Patent Number: 5,641,572
[45] Date of Patent: Jun. 24, 1997

[54] SHORT CARBON FIBER BUNDLING MASS, PROCESS FOR PRODUCING THE SAME AND FIBER-REINFORCED THERMOPLASTIC RESIN COMPOSITION

[75] Inventors: Kazunari Yoshimura, Kagawa-ken; Shigeki Tomonoh, Kodaira, both of Japan

[73] Assignee: Mitsubishi Chemical Corporation, Japan

[21] Appl. No.: 515,174

[22] Filed: Aug. 15, 1995

Related U.S. Application Data

[62] Division of Ser. No. 173,104, Dec. 27, 1993, abandoned.

[51] Int. Cl.$^6$ .................................. B32B 9/00; D02G 3/00
[52] U.S. Cl. ............................................. 428/408; 428/370
[58] Field of Search ...................... 428/357, 367, 428/370, 368, 375, 408

[56] References Cited

U.S. PATENT DOCUMENTS

| | | | |
|---|---|---|---|
| 3,853,610 | 12/1974 | Byrne et al. | 8/115.6 |
| 4,668,579 | 5/1987 | Strangman et al. | 428/367 |
| 4,772,508 | 9/1988 | Brassell | 428/408 |
| 5,077,130 | 12/1991 | Okuyama et al. | 428/367 |
| 5,227,238 | 7/1993 | Hirai et al. | 428/375 |

FOREIGN PATENT DOCUMENTS

| | | |
|---|---|---|
| 3-126608 | 5/1991 | Japan . |
| 1122645 | 8/1968 | United Kingdom . |

*Primary Examiner*—Newton Edwards
*Attorney, Agent, or Firm*—Nixon & Vanderhye

[57] ABSTRACT

Disclosed herein is a short carbon fiber bundling mass comprising not less than 90% by weight of short carbon fibers and carbonized materials derived from a resin as a sizing agent, and having not more than 0.5% of a weight loss of said short carbon fiber bundling mass when left in an inert atmosphere at a temperature of 400° C.

5 Claims, No Drawings

SHORT CARBON FIBER BUNDLING MASS, PROCESS FOR PRODUCING THE SAME AND FIBER-REINFORCED THERMOPLASTIC RESIN COMPOSITION

This is a Division of application Ser. No. 08/173,104, filed Dec. 27, 1993, now abandoned.

BACKGROUND OF THE INVENTION

The present invention relates to a bundle and/or aggregate of short carbon fibers (hereinafter referred to as short carbon fiber bundling mass), a fiber-reinforced thermoplastic resin composition obtained by mixing the short carbon fiber bundling mass with a thermoplastic resin to be able to serve as a metal substitute under high temperatures, and a process for producing the short carbon fiber bundling mass.

Recently, fiber-reinforced plastic compositions prepared by mixing or dispersing carbon fibers in various kinds of matrix are attracting attention as an industrially important material because of their excellent mechanical properties such as high strength, high rigidity, low specific gravity and high wear resistance. A resin highly improved in heat resistance, so-called super-engineering plastics is developed and it is expected that a new type of carbon fiber-reinforced resin composed of such new resin and carbon fiber is used in a new and wide scope field as a metal substitute under high temperatures.

Generally, in the preparation of fiber-reinforced resin materials by mixing or dispersing carbon fibers in various kinds of resin, when short carbon fibers are mixed in the form as they are in the resin, there arise various problems in the step of mixing or dispersion in the matrix resin. For instance, there are formed the pills of short carbon fibers in the course of their supply by a feeder, and such pills tend to cause blocking in the feed step or prevent the fibers from being uniformly dispersed in the matrix. For facilitating handling of short carbon fibers to enhance workability in the dispersion step, there are used the fiber bundles or aggregates (fiber bundling masses) formed by bunching a plurality of short carbon fibers with a sizing agent.

However, when the conventional short carbon fiber bundling masses are mixed with a resin, and then heated and molded to form a fiber-reinforced plastic molding material, gases may be generated, thereby impairing the working environment or voids may be formed in the molded product. Particularly in the case of using the super-engineering plastics having high heat resistance, since its molding temperature is high because of its high heat resistance, generation of gases is encouraged and a great many voids are formed in the molded product.

In the circumstances, there has been strong request in the art for the short carbon fiber bundling mass which, blended with a resin, enables to produce the molded products which are composed of the short carbon fiber bundling mass and the resin and are free of voids, and which have little risk of generating gases in the molding operation.

As a result of the present inventors' strenuous studies for solving the above problems, it has been found that based on the assumption that generation of gases during molding operation under heating is principally due to thermal decomposition of a sizing agent, by carbonizing a bundle of short carbon fibers with the sizing agent in an inert atmosphere at a temperature of 400° to 1,500° C., the thus-obtained short carbon fiber bundling mass comprises not less than 90 wt % of short carbon fibers and the balance substantially consisting of carbonized materials derived from a resin as the sizing agent, wherein a weight loss of the short carbon fiber bundling mass in an inert atmosphere at a temperature of 400° C. is not more than 0.5%, the short carbon fiber bundling mass is easily dispersed in a resin when mixed therewith while maintaining the form of the bundling mass, and there takes place substantially no generation of gases during the molding operation, thereby preventing formation of voids in the molded product. The present invention was achieved on the basis of this finding.

SUMMARY OF THE INVENTION

An object of the present invention is to provide a short carbon fiber bundling mass which per se maintains the state of the bundling mass and is easy to handle, and which, when mixed with a resin, is easily dispersed and shows good workability, and when used for molding with a resin, scarcely causes generation of gases even if heated at a high temperature and can provide a molded product with no or few voids.

Another object of the present invention is to provide a fiber-reinforced thermoplastic resin composition which is capable of forming the fiber-reinforced resin moldings substantially free of voids and having excellent dynamic properties.

To achieve the aim, in a first aspect of the present invention, there is provided a short carbon fiber bundling mass comprising short carbon fibers and carbonized materials derived from a resin as a sizing agent, and having not more than 0.5% of a weight loss when left in an inert atmosphere at a temperature of 400° C.

In a second aspect of the present invention, there is provided a fiber-reinforced thermoplastic resin composition comprising 1 to 50 parts by weight of a short carbon fiber bundling mass comprising short carbon fibers and carbonized materials derived from a resin as a sizing resin, said short carbon fiber bundling mass having not more than 0.5% of a weight loss in an inert atmosphere at a temperature of 400° C., and 100 parts by weight of a thermoplastic resin.

In a third aspect of the present invention, there is provided a process for producing a short carbon fiber bundling mass as defined in the first aspect, which comprises bunching short carbon fibers with a sizing agent and subjecting the obtained bundle of the short carbon fibers to carbonization treatment in an inert gas atmosphere at a temperature of 400° to 1,500° C. for 30 minutes to 24 hours.

DETAILED DESCRIPTION OF THE INVENTION

The short carbon fiber bundling mass of the present invention comprises not less than 90% by weight, preferably 90 to 99.99% by weight of short carbon fibers and the balance consisting essentially of carbonized materials derived from a resin as a sizing agent. Since the content of the carbonized material derived from a resin as a sizing agent does not exceed 10% by weight, the short carbon fibers are easily dispersed when mixed with the resin as a sizing agent. For further facilitating dispersion of the carbon fibers when mixed with the resin as a sizing agent, the content of the short carbon fibers in the short carbon fiber bundling mass is preferably selected to be 90 to 99.99% by weight, more preferably 90 to 99.9% by weight, further more preferably 93 to 99.5% by weight, still more preferably 95 to 99.5% by weight, most preferably 97 to 99.5% by weight.

The term "short carbon fibers" used in the present invention is a concept contrasted with long fibers used for the preparation of prepregs, etc. That is, the term means the carbon fibers with a length of usually not more than 5 cm, preferably 1 to 50 mm, that can be mixed and dispersed in the material to be reinforced with these fibers. The fiber diameter is preferably in the range of 4 to 30 mm.

It is preferable for providing a fiber-reinforced resin with excellent mechanical properties that the content of the short carbon fibers be as high as possible within the limits where they can maintain the form of a bundling mass. However, if the short carbon fiber content is too high and therefore the content of the carbonized material derived from a resin as a sizing agent is too low, the desired sizing effect may not be produced and it may become unable to maintain the form of a bundling mass.

The short carbon fiber bundling mass used as base material of the fiber-reinforced thermoplastic resin composition of the present invention is ones wherein a major axial diameter of the carbon fiber (length in the longitudinal direction of the carbon fiber) in the short carbon fiber bundling mass is preferably 1 to 50 mm, preferably 1 to 20 mm and number of the carbon fibers therein is preferably not more than 50,000 pieces.

The short carbon fiber bundling mass of the present invention has not more than 0.5% of a weight loss in an inert atmosphere at a temperature of 400° C., so that the short carbon fiber bundling mass is scarcely decomposed even when heated during molding and accordingly gases little generate therefrom.

The "weight loss at a temperature of 400° C." referred to herein means the percentage of the weight loss of the short carbon fiber bundling mass when heated in an inert atmosphere at a temperature of 400° C. under 1 atm for one hour.

A process for producing the short carbon fiber bundling mass of the present invention is described below.

First, the short carbon fibers are bunched with a sizing agent. There can be used various kinds of sizing agent which are commonly employed for this purpose. Among such sizing agents, preferably ones having good monofilaments focusing properties are selected. Examples of such sizing agents include homopolymers such as epoxy resins, saturated or unsaturated polyesters, polyphenylene sulfite, polyphenylene ether, polycarbonates, polyoxymethylenes, polystyrenes, polyolefins, acrylic resins, vinyl acetate resins, polyamides, phenol resins, etc., and copolymers composed of the monomers constituting the said homopolymers. Of these resins, epoxy resins and water-soluble polyamides are preferred.

The deposit amount of the sizing agent is not specifically defined as far as it is sufficient to allow the agent to exhibit its desired sizing effect. Such deposit amount may be the same as applied in ordinary sizing. It is preferably selected such that the amount of the carbonized material derived from the sizing agent in the short carbon fiber bundling mass will become not more than 10% by weight, preferably 0.01 to 10% by weight. More specifically, the deposit amount of the sizing agent is preferably selected from within the range of 0.01 to 10% by weight, more preferably 0.1 to 10% by weight, further more preferably 0.5 to 7% by weight, still more preferably 0.5 to 5% by weight, most preferably 0.5 to 3% by weight based on the total weight of the short carbon fibers. If the deposit amount of the sizing agent is less than 0.01% by weight, its sizing effect for the short carbon fiber bundling mass becomes unsatisfactory. On the other hand, when the deposit amount exceeds 10% by weight, its sizing effect for the short carbon fiber bundling mass becomes too high, and it rather serves for reducing dispersibility of the fibers in the resin, resulting in deteriorated properties of the short carbon fiber-reinforced thermoplastic resin.

Known methods can be also used for bunching the short carbon fibers with a sizing agent. For example, a bundle of hundreds to hundred of thousand, preferably 500 to 50,000 of short carbon fibers is impregnated with a sizing agent and then dried. Various methods such as mentioned below are available for conducting impregnation.

(1) A method comprises immersing the fibers in a solution prepared by dissolving a sizing agent in a solvent.

(2) A method comprises immersing the fibers in an emulsion prepared by dispersing a sizing agent in a solvent.

(3) A method comprises immersing the fibers in a solution having a sizing agent dissolved by heating.

The above-mentioned method (3), however, is unrecommendable as it is difficult, because of high tackiness of the resin, to remove the sizing agent which has once adhered to the carbon fibers, and it is also difficult with this method to control the deposit amount of the sizing agent. Further, the sizing agent may be thermally denatured when melted by heating, giving adverse effect to the properties such as heat resistance of the resin composition.

The solvents usable in the present invention for dissolving or dispersing the sizing agent include 2-butanone, tetrahydrofuran, N,N-dimethylformamide, acetone, chloroform, dichloromethane and the like. The concentration of the sizing agent in the solution or emulsion is preferably in the range of 0.5 to 20% by weight.

The solution or emulsion containing the sizing agent may contain necessary additive(s) such as surfactant, silane coupling agent, epoxy curing agent, catalyst, adhesive, etc.

Examples of the surfactants which can be added to the emulsion include polyoxyethylene alkyl ethers or polyoxyethylene alkylallyl ethers such as castor oil ether, nonylphenyl ether and styrenated phenyl ether of polyoxymethylene, and polyvinyl alcohols. These surfactants may be used either singly or in admixture. The concentration of the surfactant in the solution or emulsion is not more than 30% by weight, preferably 10 to 30% by weight.

Various known kinds of carbon fiber, such as polyacrylonitrile-based carbon fiber, rayon-based carbon fiber, pitch-based carbon fiber and polyvinyl alcohol-based carbon fibers can be used in the present invention. For use in the present invention, these carbon fibers are bunched with a sizing agent and then cut to a length of usually 1 to 50 mm, preferably 1 to 30 mm, more preferably 3 to 10 mm by a known cutting method.

The fibers bunched in a mass with a sizing agent are then carbonized in the following way. The carbonization is carried out in an inert gas at a temperature of 400° to 1,500° C., preferably 400° to 1,200° C. for a period of 30 minutes to 24 hours. If the carbonizing conditions are too mild, the sizing agent may remain on the fiber surfaces to cause a lowering of dispersibility of the fibers when mixed with the resin or generation of voids in the molded product to adversely affect its properties. On the other hand, if the carbonizing conditions are too strict, since the carbonization of the sizing agent goes forward too, its fiber binding effect is lowered, resulting in scattering of the carbon fibers and reduced workability, making it unable to obtain the stabilized properties of the molded product.

In the carbonization treatment, an oxygen concentration is important. The oxygen concentration in the carbonization treatment is preferably adjusted to be not higher than 500 ppm. If oxygen exists in a concentration not more than 500 ppm, the filaments themselves are oxidized and degraded. As the inert gas, nitrogen gas, argon gas, etc. may be exemplified. Among of them, nitrogen gas is preferred from viewpoint of the cost.

In the above carbonization treatment, the treating conditions such as temperature and time are adjusted so that the resultantly obtained short carbon fiber bundling mass would comprise not less than 90% by weight of short carbon fibers, with the balance consisting essentially of carbonized materials derived from a resin as a sizing agent, and that the weight loss of the short carbon fiber bundling mass when placed in an inert atmosphere at a temperature of 400° C. would be not more than 0.5%.

If the content of short carbon fibers in the short carbon fiber bundling mass is less than 90% by weight, their specific characteristics of the obtained composite molding material can not be fully display, and also dispersibility of the short carbon fibers is deteriorated. If the weight loss at a temperature of 400° C. exceeds 0.5%, there is a defect of gases being generated during molding and voids being formed in the molded product.

The short carbon fiber bundling mass of the present invention can be obtained in the manner described above. As for other properties of the short carbon fiber bundling mass, it is preferable that the bulk density thereof is not lower than 350 g/liter, preferably not lower than 400 g/liter. If the bulk density is outside this range, dryblending of the short carbon fibers and the matrix resin may be hampered and also extrudability of the blend may be deteriorated.

Now, the fiber-reinforced resin composition using the above-described short carbon short carbon fiber bundling mass as reinforcing material is explained.

As the base thermoplastic resin, there can be used known kinds of thermoplastic resins including heat-resistant resins such as super-engineering plastics, polymers such as polycarbonates, polystyrenes, polyesters, polyolefins, acrylic resins, polyoxymethylenes, polyphenylene ether, polyphenylene oxide, polybutylene terephthalate, polyetherether ketone, polyphenylenesulfone, fluorine resins, etc., and copolymers composed of the monomers constituting the said polymers. It is remarkable that the short carbon fiber bundling mass of the present invention is highly effective for the preparation of the fiber-reinforced thermoplastic resin compositions using as matrix heat-resistant super-engineering plastics which had the problem of generation of gases because of its high molding temperature. The heat-resistant super-engineering plastics usable in the present invention are not specified, but it is recommended to use polyetherether ketone, polyether ketone, polyetherketone ketone, polyether sulfone, polyphenylene sulfide, polyarylene sulfide, polyether-imide, polyimide, polyarylate, polysulfone, polyamide-imide, liquid crystal polymers and mixtures thereof.

In the thermoplastic resin composition of the present invention which is a blend of a short carbon fiber bundling mass and a thermoplastic resin, their blending ratio is 1 to 50 parts, preferably 5 to 40 parts of the short carbon fiber bundling mass based on 100 parts by weight of the thermoplastic resin. When the ratio of the short carbon short carbon fiber bundling mass is less than 1 part based on 100 parts by weight of the thermoplastic resin, no desired reinforcing effect of the carbon fibers is provided. When the ratio of the short carbon fiber bundling mass exceeds 50 parts based on 100 parts by weight of the resin, various problems tend to arise in the step of mixing or dispersing the fibers in the matrix resin.

The method of blending the short carbon fibers bundling mass and a thermoplastic resin is not specified in the present invention, but usually such blending is accomplished by using a single-screw extruder, twin-screw extruder, press molding machine, highspeed mixer, injection molding machine, draw molding machine or other like means.

In addition to the above components, there may be added various short and/or long fibers such as other kinds of carbon fiber, glass fiber, aramid fiber, boron fiber, silicon carbonized material fiber, fibers made of the said resin; whiskers thereof; fibrous reinforcements coated with a metal such as nickel, aluminum, copper or the like; reinforcements composed of fillers such as carbon black, molybdenum disulfide, mica, talc, calcium carbonate, etc.; stabilizer; lubricant; and other additives within range of not impairing the effect of the present invention. The blending ratio of the short and/or long fibers is not more than 50 parts by weight based on 100 parts by weight of the resin composition, and the blending ratio of the fillers is not more than 30 parts by weight based on 100 parts by weight of the resin composition.

The short carbon fiber bundling mass of the present invention maintains per se the form of the bundling mass and is, therefore, easy to handle and readily dispersed when mixed with the matrix resin. Also, this short carbon fiber bundling mass scarcely causes generation of gases even when heated at a high temperature in the molding operation and can provide a molded product with few voids.

According to the process of the present invention, it is possible to produce such useful short carbon fiber bundling mass with ease and in an industrially advantageous way.

The fiber-reinforced thermoplastic resin composite (fiber-reinforced resin moldings) of the present invention is substantially free of voids and has excellent mechanical properties.

The short carbon fiber bundling mass of the present invention and the fiber-reinforced thermoplastic resin composition using such short carbon fiber bundling mass can be advantageously applied to the production of the moldings of the fiber-reinforced thermoplastic resin compositions using super-engineering plastics with which it has been difficult to produce a molded product comprising a short carbon fiber bundling mass and a thermoplastic matrix resin because of generation of large volumes of gases during molding due to high molding temperature and consequent obstruction to the works, or to obtain a molded product with excellent mechanical properties by making use of the resin properties because of formation of many voids in the molded product. Such application of the present invention proves very advantageous in terms of workability and properties of the obtained molded product since in the process of the present invention there is no possibility of the mold being contaminated with the gases generated in the operation or is no risk of the molded product corroding or tainting other parts or elements. Thus, the present invention offers a great deal of benefits to the industries.

EXAMPLES

The present invention will be described in more detail with reference to the following examples.

The properties of the molded products were determined according to the following method:

Tensile strength: ASTM testing method (D 638).

Example 1

Production of short carbon fiber bundling mass 6,000 pieces of meso-phase pitch-type long carbon fiber (Dialead K223, produced by Mitsubishi Kasei Corp.) were immersed in an aqueous emulsion (concentration: 3 wt %) composed of 60 parts by weight of EPIKOAT 834 (Shell Chemical Co.) and 40 parts by weight of EPIKOAT 1004 (Shell Chemical Co.), then dried by heating at a temperature about 120° C. for 20 minutes and cut to a length of 6 mm to produce a bundle of short carbon fibers having 6 mm in length (epoxy resin deposit amount: 3.1 wt%). This obtained bundle was then left in nitrogen gas at a temperature of 1,000° C. for one hour to obtain a short carbon short carbon fiber bundling mass having an amount of carbonized material derived from the sizing agent of 0.1% by weight and a bulk density of 520 g/liter. The weight loss of this short carbon fiber bundling mass when left in nitrogen at a temperature of 400° C. for one hour was 0.4%.

Production of short carbon fiber-reinforced molding material 20 parts by weight of the said short carbon fiber bundling mass and 80 parts by weight of polyether-ether ketone pellets (450G, produced by ICI Corp.) were dryblended and the obtained blend was supplied into a screw extruder, melted and mixed up at a temperature of 400° C., and extruded into a strand. The obtained strand was cooled with water and cut into pellets. Feeding of the blend into the extruder was smooth, and there took place substantially no generation of gas in the course of pelletizing operation. Also, the short carbon fiber bundling mass and the resin were in a uniformly dispersed state.

The thus obtained short carbon fiber-reinforced molding material was dried at a temperature of 90° C. for 4 hours and then injection molded to obtain a test specimen.

Example 2

Production of short carbon fiber bundling mass 6,000 pieces of meso-phase pitch type long carbon fiber (Dialead K223, produced by Mitsubishi Kasei Corp.) were immersed in an aqueous polyamide solution (concentration: 3 wt%), then dried at a temperature of about 120° C. for 20 minutes and cut to a length of 6 mm to produce a bundle of short carbon fibers having 6 mm in length (polyamide deposit amount: 3.8 wt%). This obtained bundle was then left in nitrogen gas at a temperature of 500° C. for one hour to obtain the objective short carbon fiber bundling mass having an amount of carbonized material derived from the sizing agent of 0.08% by weight and a bulk density of 500 g/liter. The weight loss of this short carbon fiber bundling mass when left in nitrogen at a temperature of 400° C. for one hour was 0.2%.

Production of short carbon fiber-reinforced molding material 20 parts by weight of the above short carbon fiber bundling mass and 80 parts by weight of polyether-ether ketone pellets (450G, produced by ICI Corp.) were dry-blended and the obtained blend was supplied into a screw extruder, melted and mixed up at a temperature of 400° C. and extruded into a strand. The obtained strand was cooled with water and cut into pellets. Feeding of the blend into the extruder was smooth, and there took place substantially no generation of gas in the pelletizing operation. Also, the short carbon short carbon fiber bundling mass and the resin were in a uniformly dispersed state.

The thus obtained short carbon fiber-reinforced molding material was dried at a temperature of 90° C. for 4 hours and then injection molded to obtain a test specimen.

Comparative Example 1

Production of short carbon fiber bundling mass 6,000 pieces of meso-phase pitch type long carbon fiber (Dialead K223, produced by Mitsubishi Kasei Corp.) were immersed in an aqueous emulsion (concentration: 3 wt % composed of 60 parts by weight of EPIKOAT 834 (Shell Chemical Co.) and 40 parts by weight of EPIKOAT 1004 (Shell Chemical Co.), then dried at a temperature of about 120° C. for 20 minutes and cut to obtain a bundling mass of short carbon fibers having 6 mm in length.

The weight loss of the thus obtained bundling mass short when left in nitrogen at a temperature of 400° C. for one hour was 3.1%.

Production of short carbon fiber-reinforced molding material 20 parts by weight of the above bundling mass of short carbon fibers and 80 parts by weight of polyether-ether ketone pellets (450G, produced by ICI Corp.) were dry-blended and the obtained blend was supplied into a screw extruder, melted and mixed up at a temperature of 400° C. and extruded into a strand. In this operation, large volumes of gases were generated and it was impossible to continue production of the pellets.

Comparative Example 2

Production of short carbon fiber bundling mass 6,000 pieces of meso-phase pitch type long carbon fiber (Dialead K223, produced by Mitsubishi Kasei Corp.) were immersed in an aqueous polyamide solution (concentration: 3 wt%), then dried at a temperature of about 120° C. for 20 minutes and cut to produce a bundling mass of short carbon fibers (polyamide deposit: 3.8 wt %).

The weight loss of this bundling mass of short carbon fibers when left in nitrogen at a temperature of 400° C. for one hour was 1.4%.

Production of short carbon fiber-reinforced molding material 20 parts by weight of the above bundling mass of short carbon fibers and 80 parts by weight of polyether-ether ketone pellets (450G, produced by ICI Corp.) were dry-blended and the obtained blend was supplied into a screw extruder, melted and mixed up at a temperature of 400° C. and extruded into a strand. In this process, large volumes of gases were generated and it was hard to continue production of the pellets. Also, numerous voids existed in the strand.

The thus obtained short carbon fiber-reinforced molding material was dried at a temperature of 90° C. for 4 hours and then injection molded to obtain a test specimen.

The mechanical properties of the products of Examples 1 to 2 and Comparative Examples 1 to 2 are shown in Table 1.

TABLE 1

|  | Weight loss at 400° C. (%) | Moldability | Tensile strength kg/mm$^2$ |
| --- | --- | --- | --- |
| Example 1 | 0.4 | Good | 1,600 |
| Example 2 | 0.2 | Good | 1,700 |
| Comp. Example 1 | 3.1 | Impossible to mold | — |
| Comp. Example 2 | 1.4 | Difficult to mold | 1,000 |

What is claimed is:

1. A thermoplastic resin composition reinforced with fibers, said composition comprising:

1 to 50 parts by weight of carbon coated carbon fibers composed of short carbon fibers having a length of 1 to 30 mm and carbonized materials derived from a sizing agent, wherein the content of the short carbon fibers is 90 to 99.99 wt% and the content of the carbonized material derived from the sizing agent is 0.01 to 10% by weight said carbon coated carbon fibers having not more than 0.5% weight loss when left in an inert atmosphere at a temperature of 400° C., and 100 parts by weight of a heat-resistant thermoplastic resin.

2. The resin composition according to claim 1 wherein the melting point of the heat-resistant thermoplastic resin is not less than 200° C.

3. The resin composition according to claim 1, wherein the heat-resistant resin is selected from the group consisting of polymers of polyether-ether ketone, polyether ketone, polyether-ketone ketone, polyether sulfone, polyphenylene sulfide, polyarylene sulfide, polyetherimide, polyimide, polyarylate, polysulfone, polyamideimide, liquid crystal polymers and mixtures thereof.

4. The resin composition according to claim 1, additionally containing carbon fiber, glass fiber, aramid fiber, boron fiber, silicon carbonized material fiber or a mixture thereof in an amount of not more than 50 parts by weight based on 100 parts by weight of the resin composition.

5. The resin composition according to claim 1, further containing carbon black, molybdenum disulfide, mica, talc, calcium carbonate or a mixture thereof in an amount of not more than 30 parts by weight based on 100 parts by weight of the resin composition.

* * * * *